(12) United States Patent
Yanagita

(10) Patent No.: US 8,988,775 B2  
(45) Date of Patent: Mar. 24, 2015

(54) POLARIZING ELEMENT AND PROCESS FOR PRODUCING POLARIZING ELEMENT

(75) Inventor: Hiroaki Yanagita, Tokyo (JP)

(73) Assignee: Hoya Corporation, Tokyo (JP)

( * ) Notice: Subject to any disclaimer, the term of this patent is extended or adjusted under 35 U.S.C. 154(b) by 1055 days.

(21) Appl. No.: 12/934,507

(22) PCT Filed: Mar. 27, 2009

(86) PCT No.: PCT/JP2009/056340  
§ 371 (c)(1),  
(2), (4) Date: Dec. 14, 2010

(87) PCT Pub. No.: WO2009/119823  
PCT Pub. Date: Oct. 1, 2009

(65) Prior Publication Data  
US 2011/0102892 A1  May 5, 2011

(30) Foreign Application Priority Data  
Mar. 27, 2008  (JP) .................. 2008-084633

(51) Int. Cl.  
*G02B 5/30* (2006.01)  
*G02B 27/14* (2006.01)

(52) U.S. Cl.  
CPC ............ *G02B 5/3033* (2013.01); *G02B 27/141* (2013.01); *Y10S 359/90* (2013.01)  
USPC ................ 359/487.02; 359/900; 427/163.1

(58) Field of Classification Search  
USPC ................ 359/487.02, 900; 427/163.1  
See application file for complete search history.

(56) References Cited

U.S. PATENT DOCUMENTS

| | | |
|---|---|---|
| 6,680,125 B1 | 1/2004 | Sasaki |
| 2005/0146680 A1 | 7/2005 | Muisener et al. |
| 2006/0066947 A1 | 3/2006 | Henry |
| 2006/0146234 A1 | 7/2006 | Bear et al. |
| 2010/0104745 A1* | 4/2010 | Yanagita et al. ........... 427/163.1 |

FOREIGN PATENT DOCUMENTS

| | | |
|---|---|---|
| EP | 1 674 898 | 6/2006 |
| EP | 1 708 015 A2 | 10/2006 |

(Continued)

OTHER PUBLICATIONS

Extended European Search Report issued Jan. 23, 2014, in European Patent Application No. 09723699.6.

(Continued)

*Primary Examiner* — Ricky D Shafer  
(74) *Attorney, Agent, or Firm* — Oblon, McClelland, Maier & Neustadt, L.L.P.

(57) ABSTRACT

A polarizing element comprising an alignment layer and a polarizing layer formed by aligning a dichroic coloring agent by deposition which are successively disposed on a substrate, wherein the alignment layer is a sol-gel film formed by using a material comprising at least (A) a sol of an inorganic oxide and (B) an alkoxysilane and/or a hexaalkoxydisiloxane, and the ratio of amounts by mole of Component (B) to solid components in Component (A) [(B)/(A)(solid components)] is 99.9/0.1 to 40/60; and a process for producing the polarizing element. The polarizing element can be produced in simple steps, the treatment of abrasion of the surface necessary for alignment of a dichroic coloring agent by deposition is facilitated, and haze due to formation of cracks is absent.

11 Claims, 1 Drawing Sheet

(56) References Cited

FOREIGN PATENT DOCUMENTS

| | | | |
|---|---|---|---|
| EP | 1 708 015 | A3 | 10/2006 |
| JP | 8 238683 | | 9/1996 |
| JP | 9 227830 | | 9/1997 |
| WO | 99 57212 | | 11/1999 |

OTHER PUBLICATIONS

International Search Report issued Jun. 2, 2009 in PCT/JP09/056340 filed Mar. 27, 2009.

* cited by examiner

POLARIZING ELEMENT AND PROCESS FOR PRODUCING POLARIZING ELEMENT

FIELD OF THE INVENTION

The present invention relates to a polarizing element and a process for producing a polarizing element. More particularly, the present invention relates to a polarizing element which can be produced in simple steps, facilitates the treatment of abrasion of the surface necessary for alignment of a dichroic coloring agent by deposition and shows no haze due to formation of cracks, and a process for producing the polarizing element.

BACKGROUND ART

Heretofore, when a polarizing layer in a polarizing element such as a polarizing lens is formed by aligning a dichroic coloring agent by deposition on an alignment film on the surface of a substrate, a film of silica ($SiO_2$) formed by vapor deposition has been considered to be suitable as the alignment film. For example, a polarizing element which comprises a polarizing layer and a protective layer disposed on the surface of a transparent substrate and an inorganic intermediate layer disposed between the transparent substrate and the polarizing layer as the alignment film, is proposed (for example, refer to Patent Literature 1). The inorganic intermediate layer comprises silicon oxide, a metal oxide or a mixture of silicon oxide and a metal oxide.

As the process without using the vacuum vapor deposition, a process for forming a polarizing coating film on the curved surface of a lens in which a flat plate and a lens are placed in a manner such that axes of the flat plate and the lens are placed at different positions, the spin coating with a polarizing solution is conducted while the polarizing solution is supplied at the center of the flat plate so that the polarizing solution makes a shear flow on the curved surface of the lens, and the polarizing solution is cured, is proposed (for example, refer to Patent Literature 2).

CITATION LIST

Patent Literatures

[Patent Literature 1] Pamphlet of International Patent Publication No. 06/081006
[Patent Literature 2] Japanese Patent Application Publication (Tokuhyo) No. 2007-520739

SUMMARY OF THE INVENTION

Technical Problem

When the alignment film is formed with an inorganic substance alone as described in Patent Literature 1, the alignment film can exhibit sufficient hardness. However, the hardness itself causes difficulty in working and, moreover, vapor deposition is required to form the layer with the inorganic substance. Therefore, a drawback arises in that steps in the production of the polarizing element are complicated, and the cost of production is increased.

When the layer comprises an inorganic substance alone, the layer has a coefficient of thermal expansion greatly different from that of the substrate, and cracks are formed in the heating treatment in the production process due to the difference in the coefficient of thermal expansion. The formation of cracks causes a problem in that haze appears on the polarizing element such as a lens.

Since the film formed with a deposited inorganic substance such as $SiO_2$ has a great hardness, it is necessary that particles of an abrasive having a relatively great diameter be used for the treatment of abrasion of the surface necessary for alignment of a dichroic coloring agent by deposition, and this causes a problem in that marks of abrasion become great and haze appears on the film formed by deposition when the treatment of abrasion is conducted excessively.

In the process disclosed in Patent Literature 2, an adhesive primer layer which comprises a composition comprising polyethylene glycol (meth)acrylate or the like as the base material is formed on the curved surface of the lens before the spin coating with the polarizing solution is conducted. This primer layer comprises a composition substantially comprising components of organic substances. As described also in Patent Literature 1, when a film or a substrate used as the base for the polarizing layer is a material comprising an organic substance as the main component, a drawback arises in that the polarizing layer tends to be separated in the steps of production conducted later.

The present invention has been made under the above circumstances and has an object of providing a polarizing element which can be produced in simple steps, facilitates the treatment of abrasion of the surface necessary for alignment of a dichroic coloring agent by deposition and shows no haze due to formation of cracks, and a process for producing the polarizing element.

Solution to Problem

As the result of intensive studies by the present inventors to achieve the above object, it was found that the above object could be achieved with a polarizing element comprising an alignment layer which was a sol-gel film formed by using a material comprising at least a sol of an inorganic oxide and an alkoxysilane and/or a hexaalkoxydisiloxane and a polarizing layer formed by aligning a dichroic coloring agent by deposition, the alignment layer and the polarizing layer being disposed successively. The present invention has been completed based on the knowledge.

The present invention provides 1 to 3 described in the following.

1. A polarizing element comprising an alignment layer and a polarizing layer formed by aligning a dichroic coloring agent by deposition which are successively disposed on a substrate, wherein the alignment layer is a sol-gel film formed by using a material comprising at least (A) a sol of an inorganic oxide and (B) an alkoxysilane represented by following general formula (1) and/or a hexaalkoxydisiloxane represented by following general formula (2), and a ratio of an amount by mole of Component (B) to an amount by mole of solid components in Component (A) [(B)/(A)(solid components)] is 99.9/0.1 to 40/60:

$$Si(OR^1)_a(R^2)_{4-a} \quad (1)$$

$$(R^3O)_3Si\text{—}O\text{—}Si(OR^4)_3 \quad (2)$$

wherein $R^1$, $R^3$ and $R^4$ each independently represent an alkyl group having 1 to 5 carbon atoms, $R^2$ represents an alkyl group having 1 to 10 carbon atoms, and a represents a number of 3 or 4.

2. A process for producing a polarizing element described above which comprises following steps (I) to (IV):

Step I which comprises forming a sol-gel film on a substrate in accordance with a spin coating process using a material comprising at least (A) a sol of an inorganic oxide and (B) an alkoxysilane represented by above general formula (1) and/or a hexaalkoxydisiloxane represented by above general formula (2);

Step II which comprises treating the sol-gel film formed in Step I by abrasion in a uniaxial direction to form an alignment layer having marks of abrasion in a uniaxial direction;

Step III which comprises forming a polarizing layer by aligning a dichroic coloring agent on the alignment layer formed in Step II by deposition; and Step IV which comprises forming a protective layer for fixing the coloring agent on the polarizing layer formed in Step III.

3. A polarizing lens comprising the polarizing element described above in 1 or the polarizing element obtained in accordance with the process described above in 2.

Advantageous Effects of Invention

In accordance with the present invention, the polarizing element which can be produced in simple steps, facilitates the treatment of abrasion of the surface necessary for alignment of a dichroic coloring agent by deposition and shows no haze due to formation of cracks and the process for producing the polarizing element can be provided.

REFERENCE SIGNS LISTS

Figure 1:
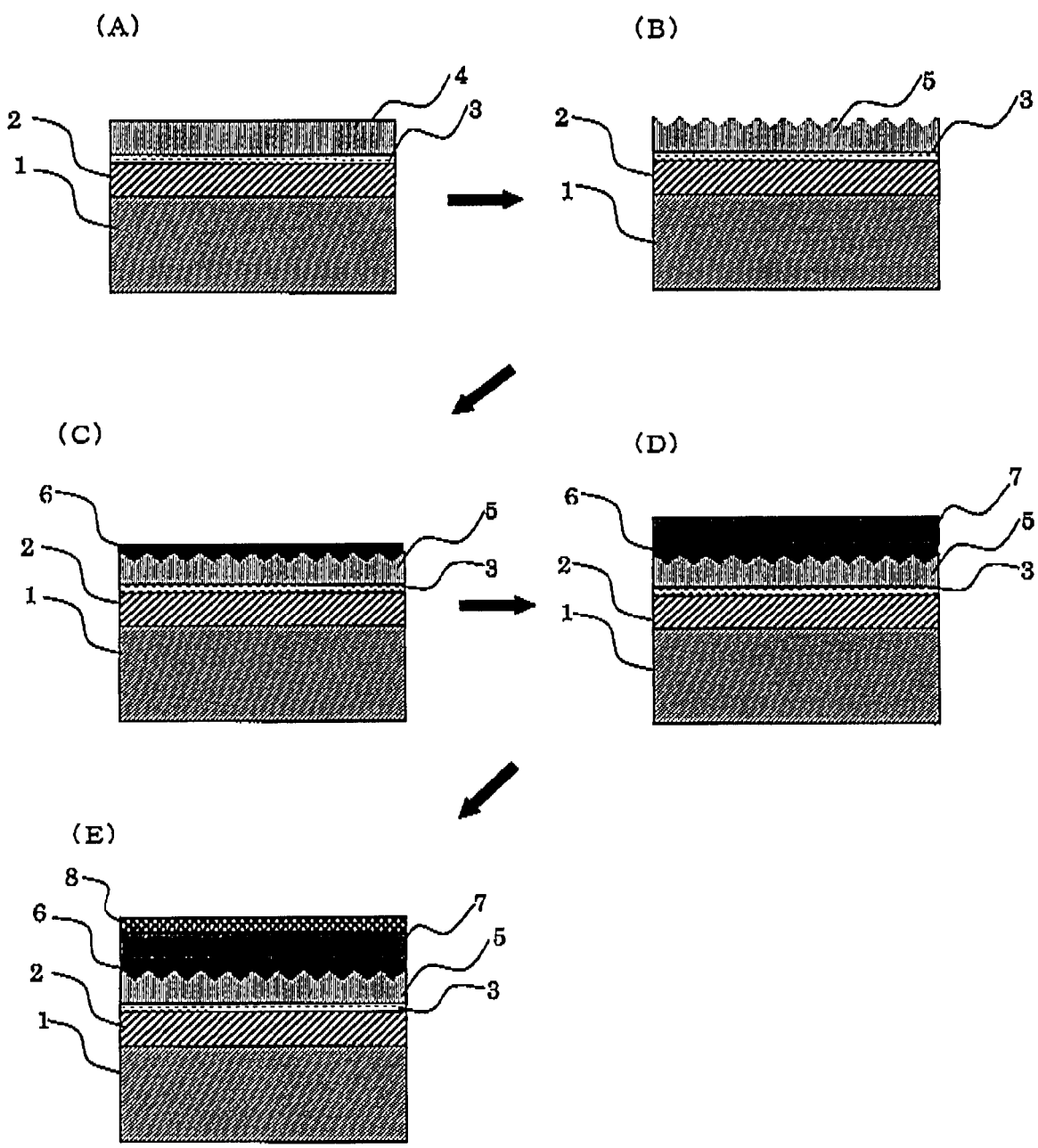
FIG. 1(A) to 1(E) shows schematic sectional views exhibiting an example of the process for preparing the polarizing element of the present invention.

1: A substrate
2: A hard coat layer
3: A layer for tight adhesion
4: A sol-gel film
5: An alignment layer
6: A polarizing layer (a layer of an aligned coloring agent)
7: A protective layer for a coloring agent (a protective layer)
8: A functional ram (a water-repelling film or the like)

DESCRIPTION OF EMBODIMENTS

The present invention will be described specifically in the following.

The polarizing element of the present invention is a polarizing element comprising an alignment layer and a polarizing layer formed by aligning a dichroic coloring agent by deposition which are successively disposed on a substrate, wherein the alignment layer is a sol-gel film formed by using a material comprising at least (A) a sol of an inorganic oxide and (B) an alkoxysilane represented by the following general formula (1) and/or a hexaalkoxydisiloxane represented by the following general formula (2), and the ratio of an amount by mole of Component (B) to an amount by mole of solid components in Component (A) [(B)/(A)(solid components)] is 99.9/0.1 to 40/60:

$$Si(OR^1)_a(R^2)_{4-a} \quad (1)$$

$$(R^3O)_3Si-O-Si(OR^4)_3 \quad (2)$$

wherein $R^1$, $R^3$ and $R^4$ each independently represent an alkyl group having 1 to 5 carbon atoms, $R^2$ represents an alkyl group having 1 to 10 carbon atoms, and a represents a number of 3 or 4.

The construction of the polarizing element of the present invention will be described with reference to FIG. 1(E). The polarizing element of the present invention comprises an alignment layer 5 and a polarizing layer 6 disposed on a substrate 1. The polarizing layer 6 is formed by aligning a dichroic coloring agent by deposition and, in general, a protective layer 7 for fixing the coloring agent is disposed on the polarizing layer. Where necessary, the polarizing element of the present invention may further comprise a hard coat layer 2 and a layer for tight adhesion 3 on the substrate 1 and a functional film 8 such as a water-repelling layer and the like on the protective layer 7 as shown in FIG. 1(E). Preferable examples of the polarizing element include polarizing lenses using a lens substrate as the substrate 1.

(Alignment Layer)

In the present invention, the alignment layer formed on the substrate is disposed so that the dichroic coloring agent can be aligned by deposition. The alignment layer comprises a sol-gel film prepared by using a material which comprises at least (A) a sol of an inorganic oxide and (B) an alkoxysilane represented by the above general formula (1) and/or a hexaalkoxydisiloxane represented by the above general formula (2) and, where necessary, may further comprise (C) an alkoxysilane having a functional group represented by the following general formula (3):

$$R^5-Si(OR^6)_b(R^7)_{3-b} \quad (3)$$

wherein $R^5$ represents an organic group having at least one functional group selected from a group consisting of glycidoxy group, epoxy group, amino group and isocyanate group, $R^6$ and $R^7$ each independently represents an alkyl group having 1 to 5 carbon atoms, and b represents a number of 3 or 2.

[(A) Sol of Inorganic Oxide]

The sol of an inorganic oxide of Component (A) is used for increasing the hardness of the alignment layer and suppressing separation of the polarizing layer. Examples of the inorganic oxide include oxides of at least one element selected from Mg, Ca, Sr, Ba, Al, In, Ge, Bi, Fe, Cu, Y, Zr, Ni, Ta, Si and Ti. It is preferable that $SiO_2$, $TiO_2$, $ZrO_2$, $CeO_2$, ZnO, $SnO_2$ and indium tin oxide (ITO) among these inorganic oxides are used from the standpoint of the stability and the easiness of preparation of a sal of fine particles. It is more preferable that silica ($SiO_2$) sol is used from the standpoint of simultaneously exhibiting the chemical stability and the effect of increasing the hardness of the film. The inorganic oxide may be used singly or in combination of two or more.

The sol of an inorganic oxide is obtained by dispersing particles of the inorganic oxide into a solvent such as an alcohol examples of which include methanol, ethanol, isopropanol, n-propanol, isobutanol, n-butanol, sec-butanol and tert-butanol. It is preferable that the content of solid components in the sol of an inorganic oxide is 0.5 to 70% by mass.

It is preferable that the diameter of particles of the inorganic oxide is 1 to 100 nm and more preferably 5 to 50 nm from the standpoint of the effect of increasing the hardness of the film and preventing formation of haze in the film itself.

When the diameter of particles of the inorganic oxide is excessively small, the effect of increasing the hardness of the film is insufficient. When the diameter of particles of the inorganic oxide is excessively great, problems arise in that the film becomes fragile and haze appears when the film is prepared.

The amount of the sol of an inorganic oxide of Component (A) as the amount of solid components is 0.1 to 60% by mole, preferably 2 to 55% by mole, more preferably 15 to 50% by mole and most preferably 25 to 40% by mole based on the sum of the amounts by mole of the solid components in Component (A) and Component (B). When the amount of solid components in Component (A) is within the above range, the alignment layer has a suitable hardness, and problems that the film becomes fragile and haze appears in the preparation of the film do not arise.

[(B) Alkoxysilane and/or Hexaalkoxydisiloxane]

The alkoxysilane represented by the following general formula (1) and/or the hexaalkoxydisiloxane represented by the following general formula (2) of Component (B) is used for forming a continuous skeleton structure in the film, providing the curable property to the film and suppressing separation of the polarizing layer.

$$Si(OR^1)_a(R^2)_{4-a} \tag{1}$$

$$(R^3O)_3Si-O-Si(OR^4)_3 \tag{2}$$

$R^1$ in the above general formula (1) and $R^3$ and $R^4$ in the above general formula (2) each independently represent an alkyl group having 1 to 5 carbon atoms and may represent any of linear, branched and cyclic groups. Examples of the alkyl group include methyl group, ethyl group, n-propyl group, isopropyl group, n-butyl group, isobutyl group, sec-butyl group, tert-butyl group, pentyl group and cyclopentyl group. Among these groups, methyl group and ethyl group are preferable.

$R^2$ in the above general formula (1) represents an alkyl group having 1 to 10 carbon atoms. Examples of the alkyl group include groups described above as the examples of the alkyl group having 1 to 5 carbon atoms, hexyl group, heptyl group, octyl group and 2-ethylhexyl group. Among these groups, methyl group, ethyl group, propyl group and butyl group are preferable. In the above general formula (1), a represents a number of 3 or 4;

Examples of the tetraalkoxysilane represented by general formula (1) in which a=4, include tetraethoxysilane (TEOS), tetramethoxysilane, tetraisopropoxysilane, tetra-n-propoxysilane, tetra-n-butoxysilane, tetra-sec-butoxysilane and tetra-tert-butoxysilane.

Examples of the trialkoxysilane represented by general formula (1) in which a=3, include methyltrimethoxysilane, methyltriethoxysilane, methyltriispropoxysilane, methyltri-n-propoxysilane, methyltri-n-butoxy-silane, methyltri-sec-butoxysilane and methyltri-tert-butoxysilane.

The hexaalkoxydisiloxane represented by general formula (2) is not particularly limited. Examples of the hexaalkoxydisiloxane include hexamethoxydisiloxane and hexaethoxydisiloxane.

Among the above compounds, tetraethoxysilane, tetramethoxysilane, methyltrimethoxysilane, methyltriethoxysilane, tetraisopropoxysilane, methyltriisopropoxysilane, hexaethoxydisiloxane and hexamethoxydisiloxane are preferable, tetraethoxysilane, tetramethoxysilane, methyltrimethoxysilane and methyltriethoxysilane are more preferable, and tetraethoxysilane is most preferable. The above compound may be used singly or in combination of two or more. In the present invention, it is preferable that, among the silane compounds represented by general formulae (1) to (3) used as Components (B) and (C), the tetraalkoxysilane represented by general formula (1) in which a=4 is used singly or in an amount greater than other silane compounds.

The amount of Component (B) is 40 to 99.9% by mole, preferably 45 to 90% by mole, more preferably 50 to 80% by mole and most preferably 60 to 75% by mole based on the sum of the amounts by mole of the solid components in Component (A) and Component (B). When the amount of Component (B) is, within the above range, the alignment layer does not have an excessively great hardness, and tight adhesion with the polarizing layer laminated on the alignment layer can be improved.

The ratio of the amount by mol of Component (B) to the amount by mole of the solid components in Component (A) [(B)/(A)(solid components)] is 99.9/0.1 to 40/60, preferably 90/10 to 45/55, more preferably 80/20 to 50/50 and most preferably 75/25 to 60/40. When the ratio of the amounts by mole is within the above range, the alignment layer does not have an excessively great hardness, and the treatment of abrasion can be conducted easily even when an abrasive having a small particle diameter such as an abrasive having an average particle diameter smaller than 2 μm is used.

[(C) Alkoxysilane Having Functional Group]

The alkoxysilane having a functional group represented by the following general formula (3) is used where necessary for forming the continuous skeleton structure in the film, providing excellent adhesion with the substrate and providing suitable flexibility to the film so that formation of cracks can be suppressed.

$$R^5-Si(OR^6)_b(R^7)_{3-b} \tag{3}$$

$R^5$ in the above general formula (3) represents an organic group having at least one functional group selected from the group consisting of glycidoxy group, epoxy group, amino group and isocyanate group. Examples of the organic group include organic groups having epoxy group such as epoxyethyl group, glycidyl group and epoxycyclohexyl group; organic groups having glycidoxy group such as glycidoxymethyl group, α-glycidoxyethyl group, β-glycidoxyethyl group, α-glycidoxypropyl group, β-glycidoxypropyl group, γ-glycidoxypropyl group, α-glycidoxybutyl group, β-glycidoxybutyl group, γ-glycidoxybutyl group and δ-glycidoxybutyl group; organic groups having amino group such as amino group, γ-aminopropyl group, N-(β-aminoethyl)-γ-aminopropyl group and N-phenyl-γ-aminopropyl group; and organic groups having isocyanate group such as isocyanate group, isocyanatomethyl group, α-isocyanatoethyl group, β-isocyanatoethyl group, α-isocyanatopropyl group, β-isocyanatopropyl group and γ-isocyanatopropyl group.

$R^6$ and $R^7$ each represent an alkyl group having 1 to 5 carbon atoms, examples of which include the groups described above as the examples of the alkyl group. b represents a number of 3 or 2 and preferably 3.

Examples of the alkoxysilane having a functional group represented by general formula (3) include γ-glycidoxypropyltrimethoxysilane (γ-GPS), γ-glycidoxypropylmethyldiethoxysilane, glycidoxymethyltrimethoxysilane, glycidoxymethyltriethoxysilane, α-glycidoxyethyltrimethoxysilane, α-glycidoxyethyltriethoxysilane, β-glycidoxyethyltrimethoxysilane, β-glycidoxyethyltriethoxysilane, α-glycidoxypropyltrimethoxysilane, α-glycidoxypropyltriethoxysilane, β-glycidoxypropyltrimethoxysilane, β-glycidoxyproyltriethoxysilane, γ-glycidoxypropyltrimethoxysilane, γ-glycidoxypropyltriethoxysilane, γ-glycidoxypropyltripropoxysilane, γ-glycidoxypropyltributoxysilane, γ-glycidoxypropyltriphenoxysilane, α-glycidoxybutyltrimethoxysilane, α-glycidoxybutyltriethoxysilane, β-glycidoxybutyltrimethoxysilane, β-glycidoxybutyltriethoxysilane, γ-glycidoxybutyltrimethoxysilane, γ-glycidoxybutyltriethoxysilane, δ-glycidoxybutyltrimethoxysilane, δ-glycidoxybutyltriethoxysilane, glycidoxymethylmethyldimethoxysilane, glycidoxymethylmethyldiethoxysilane, α-glycidoxyethylmethyldimethoxysilane, α-glycidoxyethylmethyldiethoxysilane, β-glycidoxyethylmethyldimethoxysilane, β-glycidoxyethylmethyldiethoxysilane, α-glycidoxypropylmethyldimethoxysilane, α-glycidoxypropylmethyldiethoxysilane, β-glycidoxypropylmethyldimethoxysilane, β-glycidoxypropylmethyldiethoxysilane, γ-glycidoxypropylmethyldimethoxysilane, γ-glycidoxypropylmethyldiethoxysilane, γ-glycidoxypropylmethyldipropoxysilane, γ-glycidoxypropylmethyldibutoxysilane, γ-glycidoxypropylmethyldiphenoxysilane, γ-glycidoxypropylethyldimethoxysilane, γ-glycidoxypropylethyldiethoxysilane, γ-glycidoxypropylvinyldimethoxysilane, γ-glycidoxypropylphenyldiethoxysilane, β-epoxycyclohexylethyltrimethoxysilane, β-epoxycyclohexylethyltriethoxysilane, β-epoxycyclohexylethylmethyldimethoxysilane, β-epoxycyclohexylethylmethyldiethoxysilane, γ-aminopropyltrimethoxysilane, γ-aminopropyltriethoxysilane and γ-isocyanatopropyltriethoxysilane. The alkoxysilane may be used singly or in combination of two or more.

It is preferable that the ratio of the sum of the amounts by mole of solid components in Component (A) and Component (B) to the amount by mole of Component (C) {[(A)(solid components)+(B)]/(C)} is 99.9/0.1 to 85/15 and more preferably 98/2 to 85/15. When the ratio of the amounts by mole is within the above range, adhesion between the alignment layer and the polarizing layer can be improved. The above range is preferable since the alignment layer and the polarizing layer tend to be separated when the amount of Component (C) is greater than the above range.

[Polarizing Layer]

The polarizing layer in the present invention comprises at least one dichroic coloring agent. "Dichroic" means the property such that the color of the transmitted light is different depending on the direction of transmission since the medium exhibits the anisotropic property in selective absorption of light. The dichroic coloring agent exhibits the property such that the absorption of light is great in a specific direction of the molecule of the coloring agent and small in the direction perpendicular to this specific direction when polarized light is applied. It is known that some of the dichroic coloring agents are in the liquid crystalline condition in specific ranges of the concentration and the temperature when water is used as the solvent. The liquid crystalline condition described above is called the "lyotropic liquid crystalline" condition. When the molecules of the coloring agent can be aligned in a specific direction utilizing the liquid crystalline condition of the dichroic coloring agent described above, exhibition of the dichroic property to a greater degree is made possible.

The dichroic coloring agent used in the present invention is not particularly limited, and dichroic coloring agents conventionally used for polarizing elements can be used. Examples of the dichroic coloring agent include azo-based coloring agents, anthraquinone-based coloring agents, melocyanine-based coloring agents, styryl-based coloring agents, azomethine-based coloring agents, quinone-based coloring agents, quinophthalone-based coloring agents, perylene-based coloring agents, indigo-based coloring agents, tetrazine-based coloring agents, stilbene-based coloring agent, and benzidine-based coloring agents. Examples of the dichroic coloring agent further include coloring agents described in the specifications of the U.S. Pat. No. 2,400,877 and Japanese Patent Application Publication (Tokuhyo) No. 2002-527786.

(Substrate)

The substrate used in the present invention is not particularly limited. Examples of the substrate include plastic substrates and inorganic glass substrates. Examples of the material for the plastic substrate include homopolymers of methyl methacrylate, copolymers of methyl methacrylate with at least one other monomer, homopolymers of diethylene glycol bisallylcarbonate, copolymers of diethylene glycol bisallylcarbonate with at least one other monomer, copolymers containing sulfur, copolymers containing halogens, polycarbonates, polystyrene, polyvinyl chloride, unsaturated polyesters, polyethylene terephthalate, polyurethanes, polythiourethanes and polymers using compounds having epithio group as the raw material.

The shape of the surface of the substrate is not particularly limited and may have any desired shape such as a flat shape, a concave shape and a convex shape.

In the polarizing element of the present invention, the alignment layer is formed on the substrate. The alignment layer may be laminated directly on the substrate, or a hard coat layer and a primer layer may be formed between the substrate and the alignment layer.

The hard coat layer formed between the substrate and the alignment layer where necessary is not particularly limited, and a coating composition comprising a conventional organosilicon compound and colloid particles of an inorganic oxide can be used. Examples of the organosilicon compound and the colloid particles of an inorganic oxide include those described in paragraphs [0071] to [0074] of Japanese Patent Application Laid-Open No. 2007-77327. The coating composition for a hard coat layer can be prepared in accordance with a conventional process.

As the process for forming the hard coat layer on the substrate, the process of coating the substrate with the coating composition described above can be conducted. Examples of the process for the coating include conventional processes such as the dip coating process, the spin coating process and the spray coating process. Among these processes, the dip coating process and the spin coating process are preferable from the standpoint of the figure tolerance.

For the primer layer, conventional various resins such as polyurethanes can be used from the standpoint of improvement in the property for adhesion.

(Process for Producing the Polarizing Element)

It is preferable that the process for producing the polarizing element in the present invention comprises following steps (I) to (IV):

Step I which comprises forming a sol-gel film on a substrate in accordance with the spin coating process using a material comprising at least (A) a sol of an inorganic oxide and (B) an alkoxysilane represented by the above general formula (1) and/or a hexaalkoxydisiloxane represented by the above general formula (2);

Step II which comprises treating the sol-gel film formed in Step I by abrasion in the uniaxial direction to form an alignment layer having marks of abrasion in the uniaxial direction;

Step III which comprises forming a polarizing layer by aligning a dichroic coloring agent on the alignment layer formed in Step II by deposition; and Step IV which comprises forming a protective layer for fixing the coloring agent on the polarizing layer formed in Step III.

In Step I, a sol-gel film is formed on the substrate using the material comprising Component (A) and Component (B) described above in accordance with the spin coating process (refer to FIG. 1(A)). Since it is not necessary to utilize apparatuses for the vacuum deposition of a great scale in the present step unlike the conventional process for forming a layer comprising an inorganic substance such as $SiO_2$, complicated operations are not required, and the process for the production can be simplified.

It is preferable that a coating solution as the material for forming the sol-gel film is prepared using Component (A), Component (B) and, where necessary, Component (C) which are described above. A solvent may be used in the preparation of the coating solution. Examples of the solvent include alcohols such as methanol, ethanol, isopropanol, butanol, 2-methoxyethanol, diacetone alcohol and 1-methoxy-2-propanol; amides such as dimethylformamide; and glycol ethers such as propylene glycol monomethyl ether; and water.

A catalyst may be used so that hydrolysis of the silane compound is allowed to proceed sufficiently. Examples of the catalyst include aluminum catalysts such as aluminum acetylacetonate, aluminum tetraisopropoxide, aluminum triisopropoxide, aluminum triethoxide and aluminum acetonate. It is preferable that the catalyst is used in an amount of 0.02 to 1% by mole based on the amount of the entire coating solution.

The process for preparing the coating solution is not particularly limited. The coating solution can be prepared by weighing prescribed amounts of the components, followed by sufficiently mixing the components under stirring. The order of addition of the components is not particularly limited.

It is preferable that the content of solid components in the prepared coating solution is 1 to 50% by mass and more preferably 2 to 20% by mass. The content of solid components in the coating solution can be adjusted in the desired range using a solvent examples of which are described above. The content of solid components in the coating solution can be calculated in accordance with the method described below in Examples.

The property for adhesion between the substrate and the alignment layer can be improved by a surface treatment of the substrate before the substrate is coated with the coating solution in accordance with the spin coating process. Examples of the surface treatment include chemical treatments such as treatments with acids, alkalis and various organic solvents, physical treatments such as treatments with plasma and ultraviolet rays, washing treatments using various cleaning agents, the sandblast treatment and the treatment with a primer using various resins.

A sol-gel film can be formed by applying the coating solution to the substrate in accordance with the spin coating process and, then, treating the formed film by heating. It is preferable that the thickness of the sol-gel film is 0.02 to 5 µm and more preferably 0.05 to 0.5 µm. When the thickness is 0.02 µm or greater, separation of the entire film does not takes place in the treatment of abrasion, and the function as the alignment layer can be exhibited. When the thickness is 5 µm or smaller, formation of cracks can be suppressed.

The conditions of the coating and the treatment by heating are not particularly limited. For example, a rotation speed of the spin coater of 200 to 2,000 rpm and a time of the treatment of 0.5 to 3 minutes are preferable as the condition of the coating. It is preferable that the treatment of heating is conducted at 50 to 120° C. for 0.5 to 3 hours.

In Step II, the surface of the sol-gel film prepared in step I is abraded in the uniaxial direction, and an alignment layer having marks of abrasion aligned in the uniaxial direction on the surface is formed so that the dichroic coloring agent can be aligned on the alignment layer by deposition (refer to FIG. 1(B)). It is preferable that the treatment of abrasion is conducted using an abrasive.

In the case of liquid crystals, it is known that, when a substrate is treated by friction or abrasion in a prescribed direction, the liquid crystals are aligned in a direction specifically related to the prescribed direction. For example, it is well known that the step of rubbing in which an alignment film such as a film of a polyimide disposed on a substrate is rubbed in a specific direction to align the liquid crystals in the cell is conducted in the production of liquid crystal displays (LCD). The technology in which a substrate abraded in a specific direction is coated with a solution comprising a dichroic coloring agent so that the coloring agent is aligned and the dichroic property of the coloring agent is utilized, is disclosed in the specifications of the U.S. Pat. Nos. 2,400,877 and 4,865,668.

In the present invention, the dichroic coloring agent can be aligned in the uniaxial direction through the treatment of the sol-gel film formed on the substrate by abrasion in a manner similar to alignment of liquid crystals in the production of liquid crystal displays (LCD).

The abrasive used for the treatment of abrasion is not particularly limited. For example, abrasives obtained by impregnating a cellular material such as a urethane foam with a slurry comprising particles of an abrasive can be used.

Examples of the abrasive include $Al_2O_3$, $ZrO_2$, $TiO_2$ and $CeO_2$. Among these abrasives, $Al_2O_3$ are preferable from the standpoint of the hardness in relation to the formed sol-gel film (easiness of abrasion and condition after finishing) and chemical stability. The abrasive may be used singly or in combination of two or more.

The slurry comprising particles of the abrasive may comprise viscosity modifiers and pH modifiers.

It is preferable that the average diameter of particles of the abrasive is smaller than 2 µm, more preferably 0.5 to 1.5 µm and most preferably 0.7 to 1.4 µm.

Since conventional thin films formed with inorganic substances such as thin films formed by vapor deposition of $SiO_2$ have a problem in that very finely controlled abrasion is difficult due to a great hardness, and marks of abrasion are excessively rough for some applications such as spectacle lenses. In the present invention, the treatment of abrasion using an abrasive having an average particle diameter smaller than 2 µm is possible since the film is not so hard as thin films formed with inorganic substances. Moreover, since abrasives of finer particles than those of conventional abrasives can be used, still finer abrasion is made possible, and formation of haze due to marks of abrasion can be suppressed even when the abrasion is conducted under an increased pressure or the abrasion is concentrated at a limited portion. Therefore, production of products having poor quality can be suppressed, and the polarizing element can be produced easily.

The condition of the treatment of abrasion is not particularly limited. The rotation speed, the pressure of abrasion and the time of abrasion can be suitably adjusted.

In Step III, the dichroic coloring agent is deposited and aligned on the alignment layer having marks of abrasion in the uniaxial direction which is formed in step II, and a polarizing layer is formed (refer to FIG. 1(C)).

In general, the surface of the alignment layer obtained after the treatment of abrasion is completely cleaned and dried before the polarizing layer is formed. Then, an aqueous solution or a suspension (preferably an aqueous solution) comprising the dichroic coloring agent is applied to the alignment layer having marks of abrasion. The dichroic coloring agent is treated to make the agent insoluble in water, and the polarizing layer can be formed.

A polarizing element exhibiting a desired hue can be prepared by adding coloring agents other than those described above to the aqueous solution or the suspension comprising the dichroic coloring agent as long as the effect of the present invention is not adversely affected. From the standpoint of improving properties such as the property for coating, where necessary, additives such as agents for modifying rheology, agents for promoting the adhesive property, plasticizers and leveling agents may be added.

The process for coating is not particularly limited. Examples of the process for coating include conventional processes such as the spin coating process, the dipping process, the flow coating process and the spraying process.

As for the treatment of making the dichroic coloring agent insoluble in water, it is preferable that the dichroic coloring agent coating the alignment layer is dipped into an aqueous solution of a metal salt. The metal salt used for the treatment is not particularly limited. Examples of the metal salt include $AlCl_3$, $BaCl_2$, $CdCl_2$, $ZnCl_2$, $FeCl_2$ and $SnCl_3$. Among these metal salts, $AlCl_3$ and $ZnCl_2$ are preferable from the standpoint of safety. After the treatment of making the agent insoluble in water, the surface of the dichroic coloring agent may be dried.

The thickness of the polarizing layer is not particularly limited. It is preferable that the thickness is in the range of 0.05 to 0.5 μm.

Step IV is the step in which a protective layer for fixing the coloring agent is formed on the polarizing layer formed in step III (refer to FIG. 1(D)).

As the material for forming the protective layer described above, organosilicon compounds can be used.

The organosilicon compound is not particularly limited. Examples of the preferable organosilicon compound include trialkoxysilanes having glycidoxy group such as γ-glycidoxypropyltrimethoxysilane (γ-GPS) and γ-glycidoxypropylmethyldiethoxysilane; epoxyalkylalkoxysilanes such as β-(3,4-epoxycyclohexyl)ethyltrimethoxysilane, β-(3,4-epoxycyclohexyl)ethyltriethoxysilane, β-(3,4-epoxycyclohexyl)ethyltripropoxysilane, β-(3,4-epoxycyclohexyl)ethyltributoxysilane, γ-(3,4-epoxycyclohexyl)propyltrimethoxysilane, γ-(3,4-epoxycyclohexyl)propyltriethoxysilane, δ-(3,4-epoxycyclohexyl)butyltrimethoxysilane and δ-(3,4-epoxycyclohexyl)butyltriethoxysilane; and alkoxysilanes having amino group such as N-(β-aminoethyl)-γ-aminopropyltrimethoxysilane, N-(β-aminoethyl)-γ-aminopropylmethyldimethoxysilane, N-(β-aminoethyl)-γ-aminopropylmethyldiethoxysilane, γ-aminopropylmethyldimethoxysilane, γ-aminopropylmethyldiethoxysilane, γ-aminopropyltrimethoxysilane and γ-aminopropyltriethoxysilane. The organosilicon compound may be used singly or in combination of two or more.

The protective layer can be formed by coating the polarizing layer with a solution comprising the organosilicon compound described above in accordance with a conventional process such as the dipping process, the spin coating process and the spraying process, followed by curing the formed coating layer by heating to form a film. In this process, the organosilicon compound described above penetrates into the polarizing layer, and a layer in which the protective layer for the coloring agent and the polarizing layer are substantially integrated into a single layer is formed. The thickness of the layer in which the protective layer for the coloring agent and the polarizing layer are substantially integrated into a single layer is not particularly limited. It is preferable that the thickness is in the range of 0.05 to 1 μm.

On the obtained polarizing element, a hard coat film for improving the scratch resistance and functional films such as an antireflection film, a film repelling water, a film absorbing ultraviolet light, a film absorbing infrared light, a photochromic film and an antistatic film may be formed in accordance with a conventional process (refer to FIG. 1(E)).

In accordance with the process described above, the polarizing element exhibiting excellent quality can be produced in simple steps. The polarizing element of the present invention is widely used for optical applications such as spectacle lenses, sunglasses, display instruments, light transfer instruments, window glasses of automobiles and window panes of buildings. In particular, the polarizing element is advantageously used for plastic lenses for spectacles. When the polarizing element is used for plastic lenses for spectacles, the refractive index is, in general, 1.50 to 1.80, and the Abbe number is, in general, 30 or greater.

EXAMPLES

The present invention will be described more specifically with reference to examples in the following. However, the present invention is not limited to the examples. The physical properties of the obtained polarizing elements were evaluated in accordance with the following methods.
(1) Efficiency of Polarization The parallel transmittance ($T_{//}$) and the perpendicular transmittance ($T_\perp$) were obtained in accordance with the method of ISO 8980-3, and the efficiency of polarization ($P_{eff}$) was calculated in accordance with the following equation and evaluated. The parallel transmittance and the perpendicular transmittance were measured using a visible light spectrophotometer and a polarizer.

$$P_{eff}(\%)=[(T_{//}-T_\perp)/(T_{//}+T_\perp)]\times 100$$

The chemical durability of a prepared polarizing element was evaluated by dipping the element into boiling water for 3 hours, followed by obtaining the efficiency of polarization of the element after the dipping in accordance with the same procedure as that conducted above.
(2) Transparency (Haze Value)

The haze value of a prepared polarizing element was measured using a haze meter MH-150 manufactured by MURAKAMI COLOR RESEARCH LABORATORY, and the presence or the absence of haze was examined.
(Criterion for the Evaluation)
good: no haze found (0.4%≥haze value)
poor haze found (haze value>0.4%)
(3) Adhesion Using a prepared polarizing element, the property of adhesion of the polarizing element was evaluated before and after being treated by dipping into boiling water for 3 hours in accordance with the test with a normal pressure sensitive adhesive tape under the following condition of measurement:
(Condition of Measurement)

A cured film was cut along lines forming a grid having 100 squares each having sides of 1.5 mm. A pressure sensitive adhesive tape (a cellophane tape; manufactured by NICHIBAN Co., Ltd.) was strongly attached to the resultant film and, then, rapidly peeled off. The number of squares where the film was removed with the pressure sensitive adhesive tape was counted, and the adhesion was evaluated in accordance with the following criterion:
(Criterion of Evaluation)
excellent: number of square with removed film: 0/100 (no removed film)
good: number of square with removed film: 1~2/100
fair: number of square with removed film: 3~5/100
poor: number of square with removed film: 6 or more/100

Example 1

Preparation of Coating Solution for Alignment Film

Into 4.9 g of silica sol (the medium: methanol; solid components: 30% by mass; the average diameter of primary particles: 12 nm; the trade name; "METHANOL SILICA SOL"; manufactured by NISSAN CHEMICAL INDUSTRIES, Ltd.), 29.2 g of ethanol, 10.4 g of tetraethoxysilane (TEOS)

(the molecular weight: 208.3; the trade name: "KBE-04"; manufactured by SHIN•ETSU CHEMICAL Co., Ltd.) and 2.1 g of γ-glycidoxypropyltrimethoxysilane (γ-GPS) (the molecular weight: 236.3; the trade name: "KBM-403"; manufactured by SHIN-ETSU CHEMICAL Co., Ltd.) were successively added, and the resultant mixture was stirred. Then, 2.9 g of a 0.01 mole/liter hydrochloric acid (18.4% by mole of the amount of the entire coating solution) was added, and the resultant mixture was stirred. To the obtained mixture, 0.5 g (0.18% by mole of the amount of the entire coating solution) of an aluminum catalyst (aluminum acetylacetonate) was added, and the resultant mixture was stirred sufficiently. The obtained mixture was further adjusted so that the final coating solution had the composition shown in the following. The obtained coating solution was filtered through a filter of 0.5 µm, and a coating solution for an alignment film was obtained.

Composition of Final Coating Solution

The amount of the entire coating solution: 50.0 g
The ratio of the amount by mole of TEOS to the amount by mole of solid components in the silica sol [TEOS/solid components in silica sol]: 67/33
The ratio of the sum of the amounts by mole of TEOS and solid components in the silica sol to the amount by mole of γ-GPS [(TEOS+solid components in silica sol)/(γ-GPS)]: 90/10
The content of solid components: 10% by mass of the entire coating solution.
In the above descriptions, the "amount of solid components" is the amount obtained by adding the amount of the sol of an inorganic oxide to the stoichiometric amount obtained when the entire alkoxy group (OR group; R: an alkyl group) in the alkoxysilane material is hydrolyzed to form the siloxane bond (Si—O—Si bond).

Preparation of Alignment Film

Using PHOENIX LENS (manufactured by HOYA Corporation; the refractive index: 1.53; attached with a hard coat; the diameter: 70 mm; the base curve: 4) as the lens substrate, the concave face of the lens was coated with the coating solution for an alignment film prepared in Preparation Example 1 in accordance with the spin coating process (the solution supplied at 800 rpm, and the rotation kept for 60 seconds). Then, the formed coating layer was treated by heating at 85° C. for 1 hour to cure the coating layer, and an alignment film (a sol-gel film) having a thickness of about 150 nm was prepared.

Treatment of Abrasion

The obtained alignment film was treated by abrasion in the uniaxial direction at a rotation speed of 350 rpm under an abrasion pressure of 50 g/cm$^2$ for 30 seconds using a urethane foam containing an abrasive (the abrasive: "POLIPLA 203A"; manufactured by FUJIMI Incorporated; particles of $Al_2O_3$ having an average particle diameter of 0.8 µm; the urethane foam having a shape having a curvature approximately the same as that of the concave face of the spherical lens). The lens treated by abrasion was washed with pure water and dried.

Formation of a Polarizing Layer

After the lens was dried, the surface of the lens treated by abrasion was coated with 2 to 3 g of an approximately 5% by mass aqueous solution of a dichroic coloring agent [the trade name: "VARILIGHT SOLUTION 2S"; manufactured by STERLING OPTICS Inc.] in accordance with the spin coating process, and a polarizing layer was formed. In the spin coating, the aqueous solution of the coloring agent was supplied under rotation at a speed of 300 rpm, the rotation was kept for 8 seconds, the coloring agent was supplied under rotation at a speed of 400 rpm, the rotation was kept for 45 seconds, the coloring agent was supplied under rotation at a speed of 1,000 rpm, and the rotation was kept for 12 seconds, successively. The polarizing lens in this step showed an efficiency of polarization of 99% and a transmittance of 30.5%.

Separately, an aqueous solution containing 0.15 M of iron chloride and 0.2 M of calcium hydroxide and having a pH of 3.5 was prepared. The lens treated above was dipped into the aqueous solution prepared above for about 30 seconds, taken out of the solution and sufficiently washed with pure water. The coloring agent soluble in water was made hardly soluble in water in this step.

Formation of Protective Film for Coloring Agent

The lens treated as described above was dipped into a 10% by mass aqueous solution of γ-aminopropyltriethoxysilane for 15 minutes, washed with pure water three times and cured by heating at 85° C. for 30 minutes. After the lens was cooled, the lens was dipped into a 2% by mass aqueous solution of γ-glycidoxypropyltrimethoxysilane for 30 minutes under the atmosphere of the air, cured by heating in an oven at 100° C. for 30 minutes and cooled after the curing, and a protective film for the coloring agent was formed.

Formation of Functional Film

The lens on which the protective film for the coloring agent had been formed was treated by abrasion with an abrasive (the trade name: "POLIPLA 103H"; manufactured by FUJIMI Incorporated; the average particle diameter: 0.8 µm) and, then, sufficiently cleaned. The treated lens was coated with a resin curable with ultraviolet light (the trade name: "3075"; manufactured by THREE BOND Co., Ltd.) in accordance with the spin coating process (the coating solution supplied at 500 rpm; and the rotation kept for 45 seconds). After the coating, the film was cured by irradiation with ultraviolet light from an apparatus for irradiation with ultraviolet light at an amount of irradiation of ultraviolet light of 600 mJ/cm$^2$, and a hard coat film was formed on the lens.

The efficiency of polarization, the adhesion and the transparency of the obtained polarizing lens were evaluated. The results are shown in Table 1.

Examples 2 to 23

Polarizing lenses were prepared in accordance with the same procedures as those conducted in Example 1 except that coating solutions for an alignment layer was prepared using components shown in Table 1 in amounts also shown in Table 1. In Example 23, separation was found at a portion of the polarizing layer in the treatment of dipping into a 10% by mass aqueous solution of γ-aminopropyltriethoxysilane in the step of forming a protective film for the coloring agent. The efficiency of polarization, the adhesion and the transparency of the obtained polarizing lenses were evaluated. The results are shown in Table 1.

TABLE 1

|  | Example | | | | |
|---|---|---|---|---|---|
|  | 1 | 2 | 3 | 4 | 5 |
| Composition (% by mole) Component (A) | | | | | |
| SiO₂ sol (average diameter 12 nm) | 30.0 | 14.3 | 4.8 | 1.96 | 0.49 |
| SiO₂ sol (average diameter 8 nm) | — | — | — | — | — |
| SiO₂ sol (average diameter 20 nm) | — | — | — | — | — |
| ZrO₂ sol (average diameter 15 nm) | — | — | — | — | — |
| CeO₂ sol (average diameter 20 nm) | — | — | — | — | — |
| SnO₂ sol (average diameter 15 nm) | — | — | — | — | — |
| ITO sol (average diameter 18 nm) | — | — | — | — | — |
| Component (B) | | | | | |
| tetraethoxysilane | 60.0 | 80.7 | 90.2 | 96.0 | 97.5 |
| tetramethoxysilane | — | — | — | — | — |
| methyltrimethoxysilane | — | — | — | — | — |
| methyltriethoxysilane | — | — | — | — | — |
| Component (C) | | | | | |
| γ-gylcidoxypropyltrimethoxysilane | 10.0 | 5.0 | 5.0 | 2.0 | 2.0 |
| γ-gylcidoxypropylmethyldiethoxysilane | — | — | — | — | — |
| γ-aminopropyltrimethoxysilane | — | — | — | — | — |
| γ-aminopropyltriethoxysilane | — | — | — | — | — |
| γ-isocyanatopropyltriethoxysilane | — | — | — | — | — |
| Ratio of amounts by mole | | | | | |
| [(B)/(A)(solid components)] | 67/33 | 85/15 | 95/5 | 98/2 | 99.5/0.5 |
| {[(A)(solid components) + (B)]/(C)} | 90/10 | 95/5 | 95/5 | 98/2 | 98/2 |
| Evaluation | | | | | |
| efficiency of polarization (%) | | | | | |
| before dipping into boiling water | 98 | 98 | 98 | 98 | 98 |
| after dipping into boiling water | 98 | 98 | 98 | 98 | 98 |
| transparency | good | good | good | good | good |
| adhesion | | | | | |
| before dipping into boiling water | excellent | excellent | excellent | excellent | excellent |
| after dipping into boiling water | excellent | excellent | excellent | excellent | excellent |

|  | Example | | | | |
|---|---|---|---|---|---|
|  | 6 | 7 | 8 | 9 | 10 |
| Composition (% by mole) Component (A) | | | | | |
| SiO₂ sol (average diameter 12 nm) | 24.5 | 19.0 | 49.0 | — | — |
| SiO₂ sol (average diameter 8 nm) | — | — | — | 30.0 | — |
| SiO₂ sol (average diameter 20 nm) | — | — | — | — | 30.0 |
| ZrO₂ sol (average diameter 15 nm) | — | — | — | — | — |
| CeO₂ sol (average diameter 20 nm) | — | — | — | — | — |
| SnO₂ sol (average diameter 15 nm) | — | — | — | — | — |
| ITO sol (average diameter 18 nm) | — | — | — | — | — |
| Component (B) | | | | | |
| tetraethoxysilane | 73.5 | 76.0 | 49.0 | 60.0 | 60.0 |
| tetramethoxysilane | — | — | — | — | — |
| methyltrimethoxysilane | — | — | — | — | — |
| methyltriethoxysilane | — | — | — | — | — |
| Component (C) | | | | | |
| γ-gylcidoxypropyltrimethoxysilane | 2.0 | 5.0 | 2.0 | 10.0 | 10.0 |
| γ-gylcidoxypropylmethyldiethoxysilane | — | — | — | — | — |
| γ-aminopropyltrimethoxysilane | — | — | — | — | — |
| γ-aminopropyltriethoxysilane | — | — | — | — | — |
| γ-isocyanatopropyltriethoxysilane | — | — | — | — | — |
| Ratio of amounts by mole | | | | | |
| [(B)/(A)(solid components)] | 75/25 | 80/20 | 50/50 | 67/33 | 67/33 |
| {[(A)(solid components) + (B)]/(C)} | 98/2 | 95/5 | 98/2 | 90/10 | 90/10 |
| Evaluation | | | | | |
| efficiency of polarization (%) | | | | | |
| before dipping into boiling water | 98 | 98 | 98 | 98 | 98 |
| after dipping into boiling water | 98 | 98 | 98 | 98 | 98 |

TABLE 1-continued

| | | | | | | |
|---|---|---|---|---|---|---|
| transparency | good | good | good | good | good | |
| adhesion | | | | | | |
| before dipping into boiling water | excellent | excellent | excellent | excellent | excellent | |
| after dipping into boiling water | excellent | excellent | excellent | excellent | excellent | |

| | Example | | | | | | |
|---|---|---|---|---|---|---|---|
| | 11 | 12 | 13 | 14 | 15 | 16 | 17 |
| Composition (% by mole) | | | | | | | |
| Component (A) | | | | | | | |
| SiO₂ sol (average diameter 12 nm) | 30.0 | 30.0 | 30.0 | 30.0 | 30.0 | 30.0 | 30.0 |
| SiO₂ sol (average diameter 8 nm) | — | — | — | — | — | — | — |
| SiO₂ sol (average diameter 20 nm) | — | — | — | — | — | — | — |
| ZrO₂ sol (average diameter 15 nm) | — | — | — | — | — | — | — |
| CeO₂ sol (average diameter 20 nm) | — | — | — | — | — | — | — |
| SnO₂ sol (average diameter 15 nm) | — | — | — | — | — | — | — |
| ITO sol (average diameter 18 nm) | — | — | — | — | — | — | — |
| Component (B) | | | | | | | |
| tetraethoxysilane | 30.0 | 45.0 | 45.0 | 60.0 | 60.0 | 60.0 | 60.0 |
| tetramethoxysilane | 30.0 | — | — | — | — | — | — |
| methyltrimetlioxysilane | — | 15.0 | — | — | — | — | — |
| methyltriethoxysilane | — | — | 15.0 | — | — | — | — |
| Component (C) | | | | | | | |
| γ-gylcidoxypropyltrimethoxysilane | 10.0 | 10.0 | 10.0 | 6.0 | 7.0 | 7.0 | 6.0 |
| γ-gylcidoxypropylmethyldiethoxy-silane | — | — | — | 4.0 | — | — | — |
| γ-aminopropyltrimethoxysilane | — | — | — | — | 3.0 | — | — |
| γ-aminopropyltriethoxysilane | — | — | — | — | — | 3.0 | — |
| γ-isocyanatopropyltriethoxysilane | — | — | — | — | — | — | 4.0 |
| Ratio of amounts by mole | | | | | | | |
| [(B)/(A)(solid components)] | 67/33 | 67/33 | 67/33 | 67/33 | 67/33 | 67/33 | 67/33 |
| {[(A)(solid components) + (B)]/(C)} | 90/10 | 90/10 | 90/10 | 90/10 | 90/10 | 90/10 | 90/10 |
| Evaluation | | | | | | | |
| efficiency of polarization (%) | | | | | | | |
| before dipping into boiling water | 98 | 98 | 98 | 98 | 98 | 98 | 98 |
| after dipping into boiling water | 98 | 98 | 98 | 98 | 98 | 98 | 98 |
| transparency | good | good | good | good | good | good | good |
| adhesion | | | | | | | |
| before dipping into boiling water | excellent | excellent | excellent | excellent | excellent | excellent | excellent |
| after dipping into boiling water | excellent | excellent | excellent | excellent | excellent | excellent | excellent |

| | Example | | | | | |
|---|---|---|---|---|---|---|
| | 18 | 19 | 20 | 21 | 22 | 23 |
| Composition (% by mole) | | | | | | |
| Component (A) | | | | | | |
| SiO₂ sol (average diameter 12 nm) | 15.0 | 15.0 | 15.0 | 15.0 | 15.0 | 26.4 |
| SiO₂ sol (average diameter 8 nm) | 7.5 | — | — | — | — | — |
| SiO₂ sol (average diameter 20 nm) | 7.5 | — | — | — | — | — |
| ZrO₂ sol (average diameter 15 nm) | — | 15.0 | — | — | — | — |
| CeO₂ sol (average diameter 20 nm) | — | — | 15.0 | — | — | — |
| SnO₂ sol (average diameter 15 nm) | — | — | — | 15.0 | — | — |
| ITO sol (average diameter 18 nm) | — | — | — | — | 15.0 | — |
| Component (B) | | | | | | |
| tetraethoxysilane | 60.0 | 60.0 | 60.0 | 60.0 | 60.0 | 53.6 |
| tetramethoxysilane | — | — | — | — | — | — |
| methyltrimethoxysilane | — | — | — | — | — | — |
| methyltriethoxysilane | — | — | — | — | — | — |
| Component (C) | | | | | | |
| γ-gylcidoxypropyltrimethoxysilane | 10.0 | 10.0 | 10.0 | 10.0 | 10.0 | 20.0 |
| γ-gylcidoxypropylmethyldiethoxy-silane | — | — | — | — | — | — |
| γ-aminopropyltrimethoxysilane | — | — | — | — | — | — |
| γ-aminopropyltriethoxysilane | — | — | — | — | — | — |
| γ-isocyanatopropyltriethoxysilane | — | — | — | — | — | — |
| Ratio of amounts by mole | | | | | | |
| [(B)/(A)(solid components)] | 67/33 | 67/33 | 67/33 | 67/33 | 67/33 | 67/33 |
| {[(A)(solid components)) + (B)]/(C)} | 90/10 | 90/10 | 90/10 | 90/10 | 90/10 | 80/20 |

TABLE 1-continued

| Evaluation | | | | | | |
|---|---|---|---|---|---|---|
| efficiency of polarization (%) | | | | | | |
| before dipping into boiling water | 98 | 98 | 98 | 98 | 98 | 98 |
| after dipping into boiling water | 98 | 98 | 98 | 98 | 98 | 98 |
| transparency | good | good | good | good | good | good |
| adhesion | | | | | | |
| before dipping into boiling water | excellent | excellent | excellent | excellent | excellent | good |
| after dipping into boiling water | excellent | excellent | excellent | excellent | excellent | fair |

Trade names of Components (B) and (C) used in Examples 2 to 23 are as follows:

Tetraethoxysilane: KBE-04; a trade name of a product manufactured by SHIN-ETSU CHEMICAL Corporation Tetramethoxysilane: KBM-04; a trade name of a product manufactured by SHIN-ETSU CHEMICAL Corporation Methyltrimethoxysilane: KBM-13; a trade name of a product manufactured by SHIN-ETSU CHEMICAL Corporation Methyltriethoxysilane: KBE-13; a trade name of a product manufactured by SHIN-ETSU CHEMICAL Corporation γ-Glycidoxypropyltrimethoxysilane: KBM-403; a trade name of a product manufactured by SHIN-ETSU CHEMICAL Corporation γ-Glycidoxypropylmethyldiethoxysilane: KBE-402; a trade name of a product manufactured by SHIN-ETSU CHEMICAL Corporation γ-Aminopropyltrimethoxysilane: KBM-903; a trade name of a product manufactured by SHIN-ETSU CHEMICAL Corporation γ-Aminopropyltriethoxysilane: KBE-903; a trade name of a product manufactured by SHIN-ETSU CHEMICAL Corporation γ-Isocyanatopropyltriethoxysilane: KBE-9007; a trade name of a product manufactured by SHIN-ETSU CHEMICAL Corporation

Example 24

A polarizing lens was prepared in accordance with the same procedures as those conducted in Example 1 except that the functional film was not formed.

Examples 25 to 27

Lens substrates having an alignment film were prepared in accordance with the same procedures as those conducted in Example 1. Then, using the prepared lens substrates and abrasives shown in Table 2 (particles of $Al_2O_3$ having an average diameter of 0.8 μm or 1.3 μm), the treatment of abrasion in the uniaxial direction was conducted in accordance with the same procedures as those conducted in Example 1 except that the pressure of abrasion and the time of abrasion were changed as shown in Table 2.

Polarizing layers and protective films for the coloring agent were formed in accordance with the same procedures as those conducted in Example 1, and polarizing lenses were prepared.

Comparative Examples 1 to 7

Using PHOENIX LENS used in Example 1 as the lens substrate, vapor deposition with an electron gun on the lens substrate was conducted at a temperature of the lens substrate of about 50° C. under a degree of vacuum of about $10^{-5.5}$ MPa, and lens substrates on which a film of vapor deposited $SiO_2$ (the thickness of the film: 250 nm) was formed were prepared.

Then, using the substrates prepared above and abrasives shown in Table 2 (particles of $Al_2O_3$ having an average diameter: 0.8 μm, 1.3 μm or 3 μm), the treatment of abrasion in the uniaxial direction was conducted in accordance with the same procedures as those conducted in Example 1 except that the pressure of abrasion and the time of abrasion were changed as shown in Table 2.

Polarizing layers and protective films for the coloring agent were formed in accordance with the same procedures as those conducted in Example 1, and polarizing lenses were prepared.

The efficiency of polarization of the polarizing lenses prepared in Examples 24 to 27 and Comparative Examples 1 to 7 were obtained in accordance with the method described above. The presence or the absence of haze after the abrasion in the uniaxial direction and the presence or the absence of separation of the polarizing film in the treatment of dipping into the 10% aqueous solution of γ-aminopropyltriethoxysilane in the step of forming the protective film for the coloring agent were examined by observation with eyes and evaluated. The results are shown in Table 2.

It is shown by the results in Table 2 that the processes of Examples 24 to 27 could be applied to wider ranges of the condition of abrasion than those of Comparative Examples 1 to 7 in which the polarizing film was formed on the film of vapor deposited $SiO_2$, and lenses showing no haze, providing greater degrees of polarization and causing no separation could be produced.

TABLE 2

| | | Abrasive | | Condition of abrasion | | Efficiency of polarization (%) | Haze after abrasion*2 | Separation*3 |
|---|---|---|---|---|---|---|---|---|
| | Alignment layer | type*1 | average diameter (μm) | pressure (g/cm²) | time (sec) | | | |
| Example | | | | | | | | |
| 24 | sol-gel film | A | 0.8 | 50 | 30 | 98 | good | good |
| 25 | sol-gel film | A | 0.8 | 75 | 60 | 98 | good | good |

TABLE 2-continued

| | Alignment layer | Abrasive type[*1] | average diameter (μm) | Condition of abrasion pressure (g/cm$^2$) | time (sec) | Efficiency of polarization (%) | Haze after abrasion[*2] | Separation[*3] |
|---|---|---|---|---|---|---|---|---|
| 26 | sol-gel film | A | 0.8 | 100 | 30 | 98 | good | good |
| 27 | sol-gel film | B | 1.3 | 40 | 30 | 98 | good | good |
| Comparative Example | | | | | | | | |
| 1 | SiO$_2$ alignment film | A | 0.8 | 50 | 30 | 50 | good | poor |
| 2 | SiO$_2$ alignment film | A | 0.8 | 100 | 60 | 60 | good | poor |
| 3 | SiO$_2$ alignment film | B | 1.3 | 40 | 30 | 55 | good | poor |
| 4 | SiO$_2$ alignment film | B | 1.3 | 100 | 60 | 85 | good | poor |
| 5 | SiO$_2$ alignment film | C | 3 | 50 | 30 | 98 | poor | good |
| 6 | SiO$_2$ alignment film | C | 3 | 50 | 60 | 90 | poor | good |
| 7 | SiO$_2$ alignment film | C | 3 | 75 | 20 | 80 | poor | good |

[*1]Abrasive A: the trade name: "POLIPLA 203A", manufactured by FUJIMI Incorporated Abrasive B: the trade name: "POLIPLA 207a", manufactured by FUJIMI Incorporated Abrasive C: the trade name: "WA #4000", manufactured by FUJIMI Incorporated
[*2]Criterion for the evaluation: good: no haze found poor: haze found
[*3]Criterion for the evaluation: good: no separation found poor: separation found

INDUSTRIAL APPLICABILITY

In accordance with the present invention, a polarizing element such as a polarizing lens which can be produced in simple steps, facilitates the treatment of abrasion of the surface necessary for alignment of a dichroic coloring agent by deposition and shows no haze due to formation of cracks and a process for producing the polarizing element can be provided.

The obtained polarizing element can be advantageously applied widely to optical applications such as spectacle lenses, sunglasses, display instruments, light transfer instruments, windows glasses of automobiles and window panes of buildings. In particular, the polarizing element can be applied to plastic lenses for spectacles.

The invention claimed is:

1. A polarizing element, comprising
an alignment layer and
a polarizing layer formed by aligning a dichroic coloring agent by deposition,
the alignment layer and the polarizing layer being successively disposed on a substrate,
wherein the alignment layer is a sol-gel film formed from a material comprising
(A) a sol of an inorganic oxide and
(B) an alkoxysilane represented by formula (1):

$$Si(OR^1)_a(R^2)_{4-a} \quad (1),$$

wherein R$^1$ represents an alkyl group having 1 to 5 carbon atoms, R$^2$ represents an alkyl group having 1 to 10 carbon atoms, and a represents a number of 3 or 4, or
a hexaalkoxydisiloxane represented by formula (2):

$$(R^3O)_3Si-O-Si(OR^4)_3 \quad (2),$$

wherein R$^3$ and R$^4$ each independently represent an alkyl group having 1 to 5 carbon atoms, and
a ratio of an amount by mole of (B) to an amount by mole of solid components in (A), (B)/(A), is 99.9/0.1 to 40/60.

2. The polarizing element according to claim 1, wherein the alignment layer is formed with a material further comprising (C) an alkoxysilane having a functional group represented by formula (3):

$$R^5-Si(OR^6)_b(R^7)_{3-b} \quad (3),$$

wherein
R$^5$ represents an organic group having at least one functional group selected from the group consisting of glycidoxy group, epoxy group, amino group and isocyanate group,
R$^6$ and R$^7$ represents an alkyl group having 1 to 5 carbon atoms, and
b represents a number of 3 or 2.

3. The polarizing element according to claim 2, wherein a ratio of a sum of amounts by mole of the solid components in (A) and (B) to an amount by mole of (C), [(A)+(B)]/(C), is 99.9/0.1 to 85/15.

4. The process for producing the polarizing element of claim 2, the process comprising the steps of:
(I) forming said sol-gel film on said substrate by spin coating,
(II) treating the sol-gel film formed in step (I) by abrasion in a uniaxial direction to form said alignment layer having marks of abrasion in a uniaxial direction;
(III) forming said polarizing layer by aligning said dichroic coloring agent on the alignment layer formed in step (II) by said deposition; and
(IV) forming a protective layer for fixing the coloring agent on the polarizing layer formed in step (III).

5. The process of claim 4, wherein, in step (II), the abrasion is conducted with an abrasive having an average particle diameter smaller than 2 μm.

6. The polarizing element according to claim 1, wherein an inorganic oxide in the sol of an inorganic oxide of (A) is at least one oxide selected from the group consisting of SiO$_2$, TiO$_2$, ZrO$_2$, CeO$_2$, ZnO, SnO$_2$, and ITO.

7. The polarizing element according to claim 1, wherein (B) is at least one compound selected from the group consisting of tetraethoxysilane, tetramethoxysilane, methyltrimethoxysilane, methyltriethoxysilane, tetraisopropoxysilane, methyltriisopropoxysilane, hexaethoxydisiloxane, and hexamethoxydisiloxane.

8. The polarizing element according to claim 1, wherein the sol-gel film is formed by a spin coating process.

9. The polarizing element according to claim 1, wherein the alignment layer comprises marks of abrasion formed by a treatment of abrasion of the sol-gel film in a uniaxial direction with an abrasive having an average particle diameter smaller than 2 µm.

10. The process for producing the polarizing element of claim 1, the process comprising the steps of:
　(I) forming said sol-gel film on said substrate by spin coating
　(II) treating the sol-gel film formed in step (I) by abrasion in a uniaxial direction to form said alignment layer having marks of abrasion in a uniaxial direction;
　(III) forming said polarizing layer by aligning said dichroic coloring agent on the alignment layer formed in step (II) by said deposition; and
　(IV) forming a protective layer for fixing the coloring agent on the polarizing layer formed in step (III).

11. The process of claim 10, wherein, in step (II), the abrasion is conducted with an abrasive having an average particle diameter smaller than 2 µm.

\* \* \* \* \*